US008640096B2

(12) United States Patent (10) Patent No.: US 8,640,096 B2
Arcese et al. (45) Date of Patent: Jan. 28, 2014

(54) CONFIGURATION OF COMPONENTIZED SOFTWARE APPLICATIONS

(75) Inventors: Mauro Arcese, Fontana Liri (IT); Gianluca Bernardini, Rome (IT); Michele Crudele, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 12/197,206

(22) Filed: Aug. 22, 2008

(65) Prior Publication Data

US 2010/0049959 A1 Feb. 25, 2010

(51) Int. Cl.
*G06F 9/44* (2006.01)

(52) U.S. Cl.
USPC .......................................... 717/121; 717/120

(58) Field of Classification Search
USPC .................................. 717/121, 120
See application file for complete search history.

(56) References Cited

U.S. PATENT DOCUMENTS

| 6,681,391 | B1 * | 1/2004 | Marino et al. | 717/175 |
| 7,120,558 | B2 | 10/2006 | McIntyre et al. | |
| 7,562,346 | B2 * | 7/2009 | Jhanwar et al. | 717/120 |
| 2003/0126050 | A1 | 7/2003 | Theiss et al. | |
| 2004/0093593 | A1 | 5/2004 | Jhanwar et al. | |
| 2006/0155830 | A1 | 7/2006 | Dettinger et al. | |
| 2007/0100892 | A1 | 5/2007 | Kephart et al. | |

FOREIGN PATENT DOCUMENTS

WO WO-2001/075677 A1 10/2001

OTHER PUBLICATIONS

Hwang, et al. "An Automated Approach to Componentization of Java Source Code", 2009, IEEE, p. 205-210.*
Kon, F. et al., Supporting Automatic Configuration of Component-Based Distributed Systems, http://srg.cs.uiuc.edu/2k/papers/coots99/.
Weinreich, R., et al., Remote Configuation of Agent-Based Component Systems, in Journal of Object Technology, vol. 2, No. 6, Nov.-Dec. 2003, pp. 67-84.
Jones, M., Enterprise Software Configuration Made Simple, Aug. 24, 2007, http://www.devx.com/dotnet/Article/35250.
Larsson, M., et al., Configuration Management for Component-Based Systems, SCM 10, 23rd ICSE, May 2001, Toronto, CA, http://www.mrtc.mdh.se/publications/0295.pdf.
IBM, Tivoli Application Dependendency Discovery Manager (TADDM), http://www-01.ibm.com/software/trivoli/products/taddm/.
Tivoli Configuration Manager, TCM 4.2.3, User's Guide Deployment Services, May , 2 0 0 5 , http://publib.boulder.ibm.com/infocenter/tivihelp/v3r1/topic/com.ibm.tivoli.itcm.doc/cmdsmst132.htm.

* cited by examiner

*Primary Examiner* — Qamrun Nahar
(74) *Attorney, Agent, or Firm* — DeLizio Gilliam, PLLC

(57) ABSTRACT

Centrally managing configuration of software application involves creating configuration metadata for each component of the application; providing a specific configuration for a component; checking validity of the specific configuration using the metadata for said component; and monitoring the application component configuration for consistency with said specific configuration.

17 Claims, 4 Drawing Sheets

CONFIGURATION OF COMPONENTIZED SOFTWARE APPLICATIONS

BACKGROUND OF THE INVENTION

1. Field of the Invention

The present invention relates generally to software configuration, and in particular, to configuration of componentized software application.

2. Background Information

With the advent of the software application componentization and integration initiatives, progressively more software applications are componentized. Such a paradigm has several advantages in terms of software code reuse, reduction of implementation effort, integration opportunities, etc. However, componentization can create new issues to manage in relation to central configuration of a componentized software application.

A componentized software application includes several software components (modules or pieces), each of which has its own configuration as a stand-alone application. Configuring a componentized application involves configuring all the software components used by the application in such a way that they are able to work together and be exploited successfully by an aggregating application. This is an involved task since each component is typically developed by an independent team and has its own mechanisms and repositories to manage its configuration (e.g., text files, binary files, database, registry keys, etc.). Moreover, when dealing with componentized applications, two aspects need to be considered. The first aspect involves constraints for the component configuration, wherein the same parameter can be used by different components and, in this case, it is mandatory for the parameter to assume the same value for each component (e.g., a communication port used to exchange data between two components). The second aspect involves shared components, wherein the same component can be shared among several applications and, in this case, its configuration has to be managed in a consistent manner. Each application/component tends to provide its own way of managing the configuration and the available configuration management solutions are only focused in handling configuration settings in terms of desired state at application level, without addressing a componentized infrastructure.

SUMMARY OF THE INVENTION

The invention provides a method and system for centrally managing configuration of software application components. One embodiment involves creating configuration metadata for each component of the application; providing a specific configuration for a component; checking validity of the specific configuration using the metadata for said component; and monitoring the application component configuration for consistency with said specific configuration.

The configuration metadata for each component may include one or more of: a list of application components using the current component; a list of application components required by the current component; a list of configuration parameters; a list of relations between the configuration parameters; and start and stop methods.

Each configuration parameter may define at least the following attributes: parameter name, a flag indicating if the parameter can be set without requiring a restart of the component, and functions to access and modify the parameter value.

Checking validity of the specific configuration may include: validating the configuration consistency according to relationships among configuration parameters as specified in the configuration metadata; and checking for shared components, and if a component is shared among several applications, then validating the related configurations.

Monitoring application component configurations may further include: retrieving the current configuration of components; validating the current configuration consistency; comparing the retrieved configuration with the specified configuration; and reporting invalid configurations and differences between the retrieved configuration and the specified configuration. The method may further include performing application configuration based on the specific configuration and the monitored configuration.

The method may further include providing an application configuration for all the involved components specifying values for configuration parameters exposed by the application and the related components, comprising: logical parameters including abstract configuration parameters and their mapping to the actual component specific parameters, wherein a logical parameter identifies a logical property, which may be applied to all the components of the application, thereby providing a unique view of such parameters at the application level; and application configuration pairs including key/value pairs identifying the actual configuration settings for the application and the related components, wherein for each component, the actual values for the configuration parameters exposed by the component configuration metadata are specified, such that the configuration settings specified satisfy the relations among the configuration parameters, as defined in the configuration metadata.

Other aspects and advantages of the present invention will become apparent from the following detailed description, which, when taken in conjunction with the drawings, illustrate, by way of example, the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc.

The invention provides a method and system for configuration of Componentized Software Applications. In one embodiment, the invention provides a system implementing a process enabling centralized point of configuration for use and maintenance of an overall application. The system provides configuration abstraction, cooperative shared component configuration (with veto-able stakeholder), continuous monitoring, tracking and repairing of a current configuration of an application and its underlying components, and a configuration templates library.

As such, it is not necessary to configure each component separately by interacting directly therewith, and instead, a central configuration point is utilized. The invention allows monitoring and tracking of the state of the current configuration of the underlying components in order to detect unwanted modifications that might prevent the application from working properly. A set of pre-defined configurations are provided, wherein an administrator may apply them to the application and for monitoring. If for any reason, the configuration changes its desired configuration state, repairing actions may be triggered. Further, reconfiguring the application and its underlying components is enabled even if the application is not running (e.g., when the application is not able to start because of a corrupted/wrong configuration).

Figure 1:
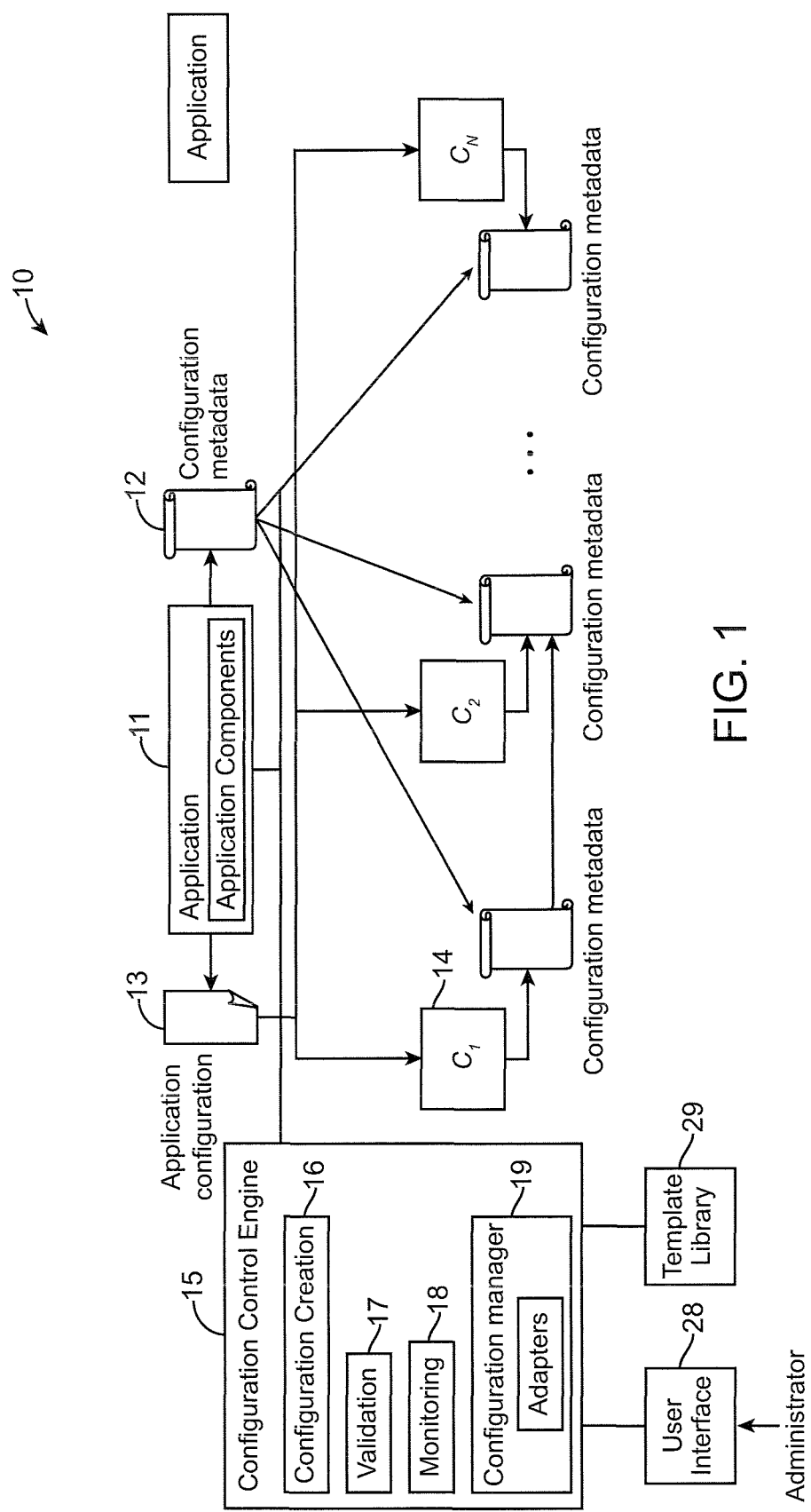
FIG. 1 shows a functional block diagram of a system for centrally managing configuration of software application components, according to an embodiment of the invention.

FIG. 1 shows a functional block diagram of a system 10 for configuration of componentized software applications, according to an embodiment of the invention. FIG. 1 specifically depicts the main data structures involved and their relationships. A configuration control engine 15 implements configuration control by leveraging such data. Each application/component 11 provides a configuration metadata descriptor 12 including at least the following information:

Exploiters: A list of all the applications/components using the current component.

Dependencies: A list of all the components required by the current component.

Configuration definition: A list of all the configuration parameters that can be specified for the current component. Each configuration parameter must define at least the following attributes:

Name: The parameter name.

Hot-config-allowed: A flag specifying if the parameter can be set without requiring a restart of the component.

Getters/Setters: Functions to access and modify the parameter value. This can be implemented as an external adapter.

Parameters relations: A list of relations among the configuration parameters of the current component and one or more parameters of a dependent component.

Start/Stop methods: The way to start/stop the component. This can be implemented as an external adapter.

Moreover, each application provides an actual application configuration 13 for all the involved components, by specifying values for each of the configuration parameters exposed by the application and the related components. The configuration 13 includes at least the following information:

Logical parameters: A list of abstract configuration parameters and their mapping to the actual component specific parameters. A logical parameter is used to identify a logical property, which may be applied to all the components building the application. This provides a unique view of such parameters at the application level, without having to deal with component specific settings. For example, a trace_level logical parameter 14 may be mapped to $C_1$.trc_level, $C_2$.trace_level, ..., $C_N$.trace_param. In this way, the end user willing to enable traces for application A, has to handle only the trace_level logical parameter, and the system manages setting the actual values for all the involved components, according to the mapping provided in the logical parameter definition.

Application Configuration Pairs: A list of key/value pairs identifying the actual configuration settings for the application and the related components. For each component, the actual values for the configuration parameters exposed by the component configuration metadata descriptor 12 are specified. Additionally, for each parameter an attribute (e.g., is_modifiable) may be used to specify if the parameter value can be modified by other exploiters. The configuration settings specified must satisfy the relations among the configuration parameters, as defined in the configuration metadata descriptors.

Figure 2:
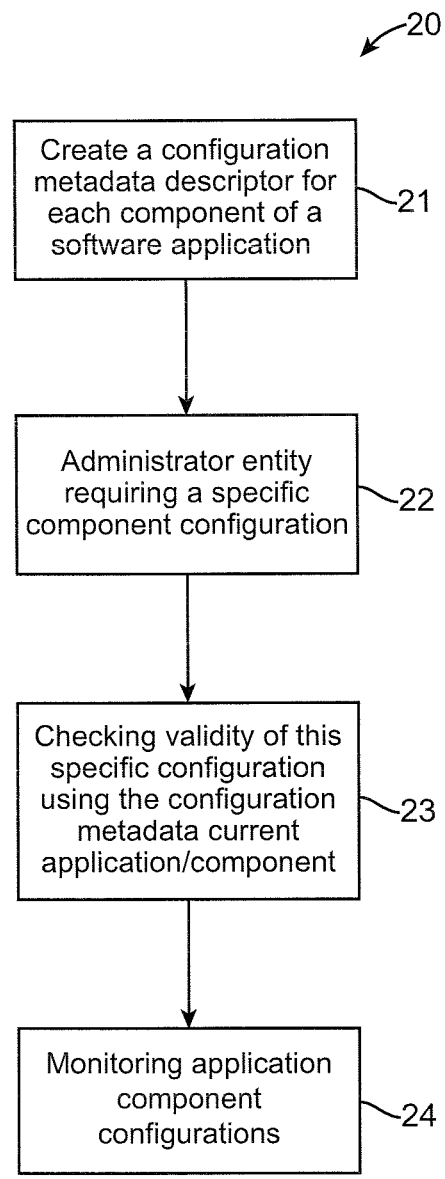
FIG. 2 shows a flowchart of a process for centrally managing configuration of a software application component, according to an embodiment of the invention.

FIG. 2 shows a flowchart of a process 20 for managing system configurations of application components using the above information, according to an embodiment of the invention. Processing block 21, implemented by a configuration creation module 16 (FIG. 1), involves creating a configuration metadata descriptor for each component of a software application, the configuration metadata descriptor including: a list of application components using the current component, a list of application components required by the current component, a list of configuration parameters, a list of relations between the configuration parameters, and start and stop methods.

Processing block 22 involves an administrator entity providing (e.g., requiring) a specific component configuration. Processing block 23, implemented by a validation module 17 (FIG. 1), involves checking validity of this specific configuration using the configuration metadata for current application/component. Processing block 24, implemented by a monitoring module 18 (FIG. 1), involves monitoring application component configurations. Monitoring application component configurations includes: periodically retrieving the current configuration of activated components, validating the configuration consistency, comparing the retrieved configuration with the one provided/required by the administrator, reporting invalid configurations to the administrator along with differences between the retrieved configuration and what is required. A configuration manager 19 (FIG. 1) utilizes the data structures in FIG. 1 (described further above) to handle the configurations of application components by applying the configurations specified by the administrator. In addition it also is able to continuously monitor, validate and optionally repair the current configuration according to a reference desired configuration state.

The configuration control engine 15 can be implemented either as a stand-alone tool (FIG. 1) or directly embedded into the application 11. In the first case, the user may (re)configure the application 11 even if the application 11 is not running (executing), while in the second case the user may directly leverage a user interface of the application 11 to perform configuration changes via the embedded control engine 15.

The configuration manager 19 (in conjunction with the modules 16-18) enables applying/changing application configuration. It allows an administrator to browse the composite application configuration and eventually modify one or more parameter values. Moreover, the administrator may utilize a user interface 28 (FIG. 1) to leverage predefined configuration templates from a library 29 (FIG. 1) and apply one of them to the application 11. For example, the administrator may define several configuration templates such as maintenance mode, test mode, production mode, etc. When a configuration change is triggered, the validation module 17 validates the configuration consistency according to relationships among configuration parameters as specified in the configuration metadata descriptors 12. In this context, the validation module 17 also checks for shared components. If a component is shared among several applications (i.e., it has more than one exploiter in its exploiters list), the related configurations must be validated as well.

Figure 3:
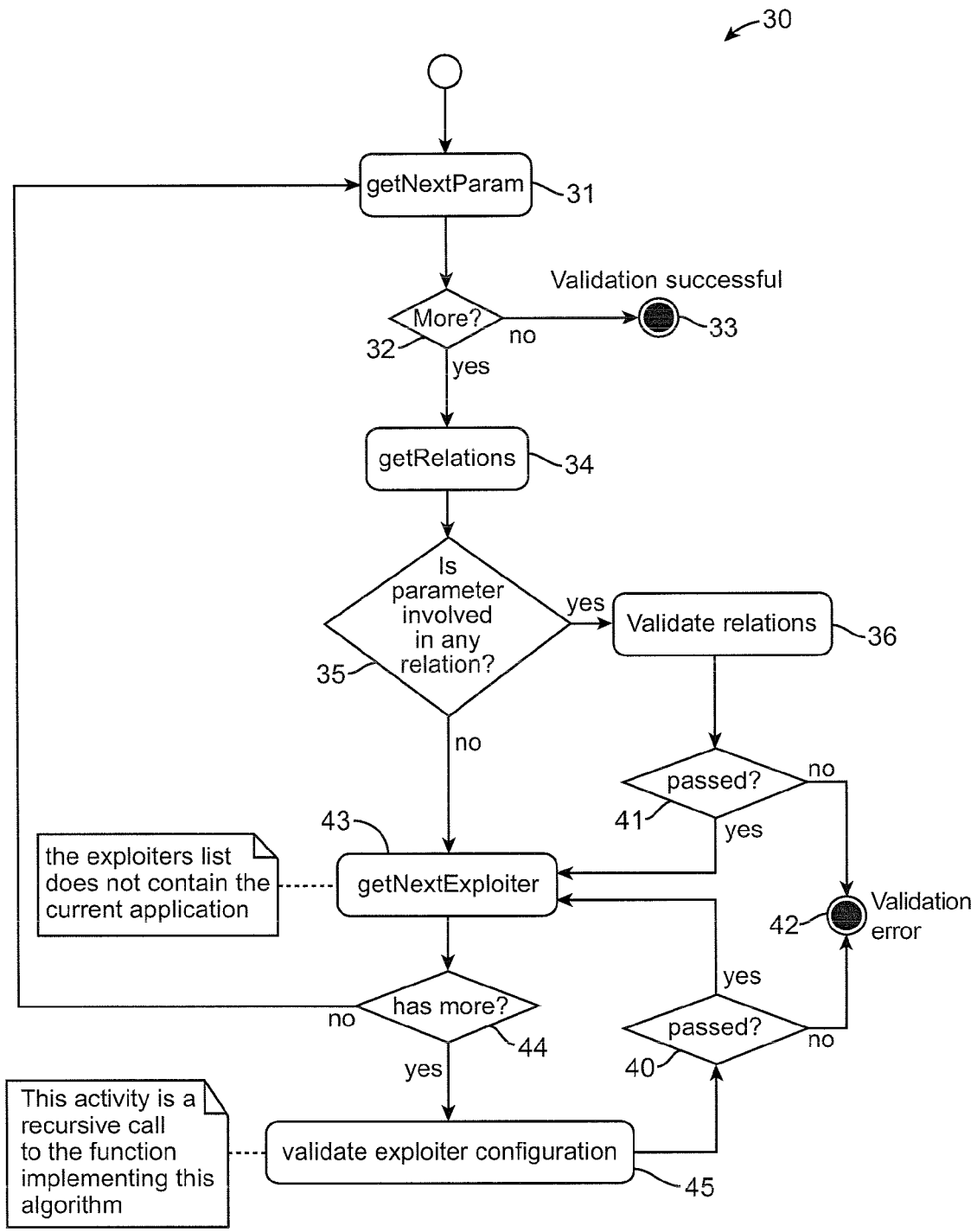
FIG. 3 shows a flowchart of a validation process for centrally managing configuration of software application components, according to an embodiment of the invention.

FIG. 3 shows a flowchart of a process 30 for validating a configuration change, according to an embodiment of the invention. The process 30 involves attempting to obtain the next parameter via a getNextParam function (step 31). Determining if a next parameter was obtained (step 32). If no additional parameter was obtained, then validation is successful, stop (step 33). If a parameter was obtained, then attempt to obtain any corresponding relations for the parameter via a getRelations function (step 34). Determine if the parameter is involved in any relations (step 35). If not, proceed to step 43, otherwise attempt to validate the relations (step 36). Determine if the validation process was successful (step 41); if not, then generate a validation error indication and stop (step 42); if yes, attempt to obtain a next exploiter via getNextExploiter function (step 43). Determine if an exploiter was obtained (step 44). If an exploiter was obtained, then attempt validating exploiter configuration (step 45), determine if validation passed (step 40), if passed, proceed to step 43, and stop (step 42). If an exploiter was not obtained, then proceed to step 31. The validate relation activity may also verify that the configuration does not violate the constraints specified by the is_modifiable attribute, discussed above.

To monitor and validate a configuration, the controller engine 15 provides a continuous monitoring of the application configuration via the monitoring module 18 and checks its consistency via the validation module 17. Additionally, the configuration manager 19 may be configured to compare the current configuration with a desired level defined by one of the available configuration templates. In one example, the configuration manager 19 periodically performs the following operations:

Retrieving the current configuration by leveraging the information stored into the metadata descriptors (i.e., using the get functions specified for each component).
Validating the configuration consistency as described above.
Comparing, optionally, the current configuration with a desired configuration, according to a configuration template selected by the administrator.
Notifying the administrator if the current configuration is either not valid or differs from the desired configuration.

The above operations may also be triggered by the administrator whenever there is a need to validate the applied configuration, without waiting for the periodic check to occur. The controller engine 15 also provides repairing of a configuration. In one example, the controller engine 15 allows an administrator to repair the current configuration as follows: If a validation check fails due to inconsistent values specified for related parameters, the configuration manager 19 displays all the violations of the configuration relations and allows the administrator to correct them by resetting the values of some of the involved parameters. If the configuration differs from the desired level, the configuration manager 19 allows the administrator to re-apply the desired configuration template. The configuration manager 19 may also automatically repair the configuration by re-applying the selected template.

The system 10 (FIG. 1) is not tied to any specific runtime computing environment or implementation and may be adapted to different implementations as those skilled in the art will recognize. For example, the metadata descriptors may be represented as XML files, the application components may comprise both native and Java components, the controller engine 15 may be implemented as a set of command lines, a shared library, or an archive. The system provides configuration management capabilities and manages common configuration repositories (e.g., .ini files, .xml files, properties files, Windows registry keys, and generic text files). The system can be extended by adding custom adapters to manage specific configurations (i.e., implementation of methods to get and set the related parameters and start/stop of the related components).

Figure 4:
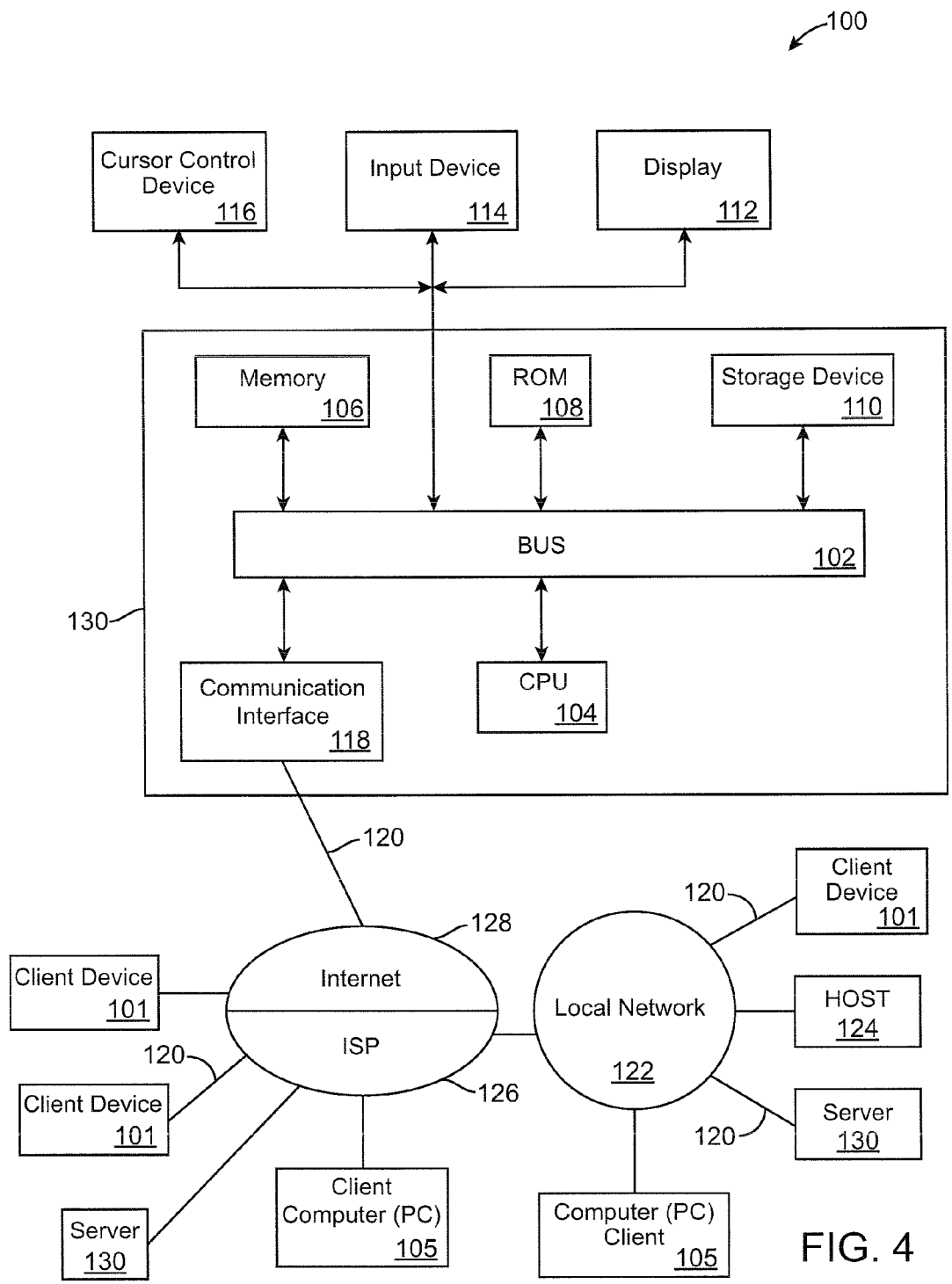
FIG. 4 shows a functional block diagram of an example computing system in which the invention can be implemented.

FIG. 4 shows a block diagram of an example architecture of an embodiment of a computing system 100 in which the present invention can be implemented. The system 100 includes one or more client devices 101 connected to one or more server computing systems 130. A server 130 includes a bus 102 or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and/or adding instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data and address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 cause the processor 104 to perform the process steps described herein. One or more processors in a multi-processing arrangement may also be employed to execute the sequences of instructions contained in the main memory 106. In alternative embodiments, hard-wired circuitry may be used in place of, or in combination with, software instructions to implement the invention. Thus, embodiments of the invention are not limited to any specific combination of hardware circuitry and software.

The terms "computer program medium," "computer usable medium," "computer readable medium", and "computer program product," are used to generally refer to media, such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium", as used herein, refers to any medium that participated in providing instructions to the processor 104 for execution. Such a medium may take many forms, including but not limited to, non-volatile media, volatile media and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world-wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126, in turn, provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail and program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to, for example, as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122 for communication with the servers 130.

The system 100 can further include computers (e.g., personal computers, computing nodes) 105 operating the same manner as client devices 101, wherein a user can utilize one or more computers 105 to manage data in the server 130.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for centrally managing configuration of components of a software application, said method comprising:
   creating configuration metadata for each component of the software application, wherein
      the configuration metadata for each component comprises
      a list of application components using said each component,
      a list of application components required by said each component,
      a list of configuration parameters,
      a list of relations between the configuration parameters, and
      start and stop methods;
   providing a specific configuration for a component;
   checking a validity of the specific configuration using the configuration metadata for said component; and
   monitoring one or more subsequent configurations of said component for consistency with said specific configuration that has been validated with the configuration metadata based, at least in part, on said checking the validity of the specific configuration using the configuration metadata for said component.

2. The method of claim 1, wherein each configuration parameter defines attributes comprising:
   parameter name, a flag indicating if the parameter can be set without requiring a restart of said each component, and functions to access and modify a value of the configuration parameter.

3. The method of claim 2, wherein checking validity of the specific configuration includes:
   validating the configuration consistency according to relationships among configuration parameters as specified in the configuration metadata; and
   checking for shared components, and if a component is shared among several applications, then validating the related configurations.

4. The method of claim 2, wherein monitoring application component configurations further includes:
   retrieving a current configuration of components, wherein the one or more subsequent configurations comprise the current configuration;
   validating the current configuration consistency;
   comparing the retrieved configuration with the specified configuration; and
   reporting invalid configurations and differences between the retrieved current configuration and the specified configuration.

5. The method of claim 4 further including performing application configuration based on the specific configuration and the monitored one or more subsequent configuration.

6. The method of claim 5 further including providing an application configuration for all the involved components specifying values for configuration parameters exposed by the application and the related components, comprising:
   logical parameters including abstract configuration parameters and their mapping to the actual component specific parameters, wherein a logical parameter identifies a logical property, which may be applied to all the components of the application, thereby providing a unique view of such parameters at the application level; and
   application configuration pairs including key/value pairs identifying the actual configuration settings for the application and the related components, wherein for each component, the actual values for the configuration parameters exposed by the component configuration metadata are specified, such that the configuration settings specified satisfy the relations among the configuration parameters, as defined in the configuration metadata.

7. A system for centrally managing configuration of components of a software application, comprising:
   a memory;
   a bus, coupled to said memory; and
   a processor, coupled to said bus, to execute instructions, which when executed, cause said processor to perform a method comprising
      creating configuration metadata for each component of the software application,
         wherein the configuration metadata for each component comprises
         a list of application components using said each component,
         a list of application components required by said each component,
         a list of configuration parameters,
         a list of relations between the configuration parameters, and
         start and stop methods;
      providing a specific configuration for a component;
      checking a validity of the specific configuration using the configuration metadata for said component; and
      monitoring one or more subsequent configurations of said component for consistency with said specific configuration that has been validated with the configuration metadata based, at least in part, on said checking the validity of the specific configuration using the configuration metadata for said component.

8. The system of claim 7, wherein each configuration parameter defines attributes comprising:
   parameter name, a flag indicating if the configuration parameter can be set without requiring a restart of said each component, and functions to access and modify a value of the configuration parameter.

9. The system of claim 8, wherein the checking validity of the specific configuration includes:
   validating the configuration consistency according to relationships among configuration parameters as specified in the configuration metadata; and checking for shared components, and if a component is shared among several applications, then validating the related configurations.

10. The system of claim 8, wherein monitoring application component configurations further includes:
retrieving a current configuration of components, wherein the one or more subsequent configurations comprise the current configuration;
validating the current configuration consistency;
comparing the retrieved configuration with the specified configuration; and
reporting invalid configurations and differences between the retrieved current configuration and the specified configuration.

11. The system of claim 10, said method further comprising performing application configuration based on the specific configuration and the monitored one or more subsequent configurations.

12. A computer program product for centrally managing configuration of components of a software application, said computer program product comprising a non-transitory computer usable medium including a computer readable program, wherein the computer readable program, when executed on a computer, causes the computer to:
create configuration metadata for each component of the software application, wherein the configuration metadata for each component comprises
a list of application components using said each component,
a list of application components required by said each component,
a list of configuration parameters,
a list of relations between the configuration parameters, and
start and stop methods;
check a validity of a specific configuration for a component, using the configuration metadata for said component; and
monitor one or more subsequent configurations of said component for consistency with said specific configuration that has been validated with the configuration metadata based, at least in part, on said checking the validity of the specific configuration using the configuration metadata for said component.

13. The computer program product of claim 12 wherein each configuration parameter defines attributes comprising:
parameter name, a flag indicating if the configuration parameter can be set without requiring a restart of said each component, and functions to access and modify a value of the configuration parameter.

14. The computer program product of claim 13 wherein the instructions for checking validity of the specific configuration further include instructions for:
validating the configuration consistency according to relationships among configuration parameters as specified in the configuration metadata; and
checking for shared components, and if a component is shared among several applications, then validating the related configurations.

15. The computer program product of claim 13, wherein the instructions for monitoring further include instructions for monitoring application component configurations by:
retrieving a current configuration of components, wherein the one or more subsequent configurations comprise the current configuration;
validating the current configuration consistency;
comparing the retrieved configuration with the specified configuration; and
reporting invalid configurations and differences between the retrieved current configuration and the specified configuration.

16. The computer program product of claim 15 further including instructions for performing application configuration based on the specific configuration and the monitored one or more subsequent configurations.

17. The computer program product of claim 16 further including instructions for performing application configuration for all the involved components specifying values for configuration parameters exposed by the application and the related components, comprising:
logical parameters including abstract configuration parameters and their mapping to the actual component specific parameters, wherein a logical parameter identifies a logical property, which may be applied to all the components of the application, thereby providing a unique view of such parameters at the application level; and
application configuration pairs including key/value pairs identifying the actual configuration settings for the application and the related components, wherein for each component, the actual values for the configuration parameters exposed by the component configuration metadata are specified, such that the configuration settings specified satisfy the relations among the configuration parameters, as defined in the configuration metadata.

* * * * *